Patented Mar. 24, 1942

2,277,063

UNITED STATES PATENT OFFICE 2,277,063

LEAD ALUMINATE PIGMENT AND PAINT AND METHOD OF MAKING SAME

Louis E. Barton, Windsor, Conn.

No Drawing. Application April 25, 1939,
Serial No. 270,013

24 Claims. (Cl. 23—52)

My invention relates generally to pigments, their preparation and application, and more specifically to a new and improved type of opaque white pigments—the aluminates of lead—together with improved methods of making same and their application in paints.

In my co-pending application for Patent Serial No. 41,867 filed in the United States Patent Office September 24, 1935, I have described an improved method of making white aluminates of certain metallic elements, which may be summarized as consisting in heating a mixture containing an oxide of the metallic element and the oxide of aluminum to a temperature sufficiently high to form the aluminate, but without fushion of the charge. As regards lead aluminate pigments the process was limited to formation of the products in the temperature range 810 to 850° C. although it was stated that the product could be made at lower temperatures but required a much longer time. The process was also limited to lead aluminate pigments containing from 68.6% to 81.4% lead oxide and the balance aluminum oxide although it was stated that lead aluminates of other proportions could be made.

In my co-pending application for patent Serial No. 188,926 filed in the United States Patent Office February 5, 1938—a continuation-in-part of my application Serial No. 41,867 before referred to—I have disclosed a process of making lead aluminate pigments containing 68.6% to 81.4% lead oxide and the balance aluminum oxide which consists in heating mixtures containing those oxides in the temperature range 725 to 900° C. until the said oxides chemically combine in the solid phase without fusion. The stability of the resulting lead aluminate pigment was stressed, particularly those made at the higher temperatures as indicated by the results in the table, page 8 of the specification.

In my co-pending application for patent Serial No. 117,341 filed in the United States Patent Office December 23, 1936, I have disclosed a process of making lead aluminate pigments of improved stability and resistance to discoloration and excessive hydration when the pigment is subjected to the action of water. Such improved process consists in pre-calcining aluminum oxide at temperatures above 900° C. to form a material containing alpha aluminum oxide, mixing the pre-calcined aluminum oxide with lead oxide in proportions to form lead aluminate containing 68.6 to 81.4% lead oxide and the balance aluminum oxide and heating the mixture in the temperature range 810 to 850° C. until the said oxides chemically combine in the solid phase. The degree of stability of the lead aluminate increases with the pre-calcination temperature of the alumina or extent of conversion of the alumina to the alpha form, while the amount of hydration which takes place upon treating the lead aluminate with water decreases. In all cases where the alumina has been pre-calcined above 900° C. the resulting lead aluminates are improved in stability and with the higher pre-calcination temperature or more nearly complete conversion to the alpha form the lead aluminate pigments are perfectly stable.

This application is a continuation-in-part of my co-pending patent applications referred to, U. S. Serial No. 41,867, filed September 24, 1935; U. S. Serial No. 188,926, filed February 5, 1938; and U. S. Serial No. 117,341, filed December 23, 1936. The specification in this application embodies all the subject matter in the prior applications referred to. In addition, it is the object of this application to show the working of my process in the preparation of all my lead aluminate pigments within the temperature range 725° C. to 900° C. It is also an object of the present application to show the distinction in structure of lead aluminates made with the gamma and alpha forms of aluminum oxide respectively and also to show the greater stability of the latter.

According to Garre, "Chemiker-Zeitung," No. 85, p. 662, 1926, lead aluminate cannot be prepared by heating a mixture of litharge and alumina rapidly near the melting point of litharge since lead oxide starts to fume off at a dull red heat; but it can be prepared by heating an extremely fine equi-molecular mixture of litharge and alumina for a prolonged period at 700° C., particularly if the charge is disintegrated occasionally during the heating.

The preparation of lead aluminate at temperatures about 700° C. as described by Garre, I have found impractical on account of the excessive length of time required, the necessity of intermittently cooling and disintegrating the particles and, finally, the unsatisfactory color of the product which, though light colored, does not have the white or cream white color which is indispensable for general application as a white pigment for paint.

I have discovered that lead aluminate pigments can be successfully made, by reaction in the solid phase, only at temperatures above 700° C.; the practical limitations of temperature range being about 725 to 880° C. and preferably at temperatures a little below the melting point of litharge, 880° C. Under such conditions intermittent disintegration during the heating is unnecessary and there is no appreciable loss of lead oxides by volatization.

In brief, my process of making lead aluminate pigments consists in making a mixture of such lead and aluminum compounds as will, when heated, supply to the product only lead and aluminum oxides, and then heating the mixture in the temperature range about 725 to 880° C. until the oxides of lead and aluminum chemically combine by reaction in the solid phase without fushion of the charge.

In Table I are shown the details of operation and characteristics of lead aluminates prepared by calcining the mixed charges at various temperatures. The charges were prepared by wet-milling the mixtures of lead oxide and aluminum compound for one hour and then dewatering and drying the mixture.

The progress of the reaction was determined by withdrawing small portions of the charge, grinding part of the sample in an agate mortar and comparing the color with that of the unground portion. The heating was continued until there was no difference in color between ground and unground material.

In cases where intermittent disintegration was resorted to, it was accomplished by cooling and grinding the entire charge in an agate mortar.

can be made at a temperature of 700° C., as shown by Examples 1 and 2, they are by no means clear white as compared with the products of Examples 4, 5 and 8 made at higher temperatures. The results of Example 7 compared with Example 8 show the practical necessity of preparing the lead aluminate at the higher temperatures if the mixture contains alpha aluminum oxide.

The relation of time and temperature in preparing lead aluminates and the importance of employing the higher temperatures is strikingly shown in graphical form in Figure 1, in which curve C shows the results for Examples 1, 3, 4 and 5 calcined at 700, 725, 750 and 840° C. respectively, as shown in the Table I. For comparison curve A is given for lead aluminates made in the same way and at the same temperatures but with a different stock of materials and equipment. Curve B shows the results for a series of lead aluminates made in the same way and at the same temperatures but in which the alumina used had been pre-calcined at a temperature of 950° C.

The curves A and C are not in exact agreement, probably due to the difference in raw materials used, but they are in excellent general agreement and both sets of results show the sharp reduction in the reaction velocity at temperatures below 725° C.

It will be noted that curves A and C were not drawn to pass directly through the points for 96 and 107 hours respectively at 700° C. This is because neither product under those conditions was white, or finished, and the theoretical point at which they would be white is somewhere above the point shown.

The determinations made, and the graphs resulting from them show the impracticability of making lead aluminate at a temperature of 700° C. The form of the curves also show a critical temperature range within which the product can be economically made without fusion and sufficiently white to be industrially useful. This critical temperature range is covered by those portions of the curves which are approximately parallel to the ordinates and lying between 725 and 850° C.

My lead aluminate pigments made as before described, have physical properties which make them suitable for use in paints and for other

*Table I*

| Example No. | Nature of aluminum compound used | Calcining temperature, °C. | Treatment during calcination | Time heated, hours | Color of finished product |
|---|---|---|---|---|---|
| 1 | Aluminum hydrate | 700 | None | 107 | Light yellow. |
| 2 | do | 700 | Disintegrated every 24 hours. | 107 | Brown-cream. |
| 3 | do | 725 | None | 28 | Do. |
| 4 | do | 750 | do | 4 | Clear white. |
| 5 | do | 840 | do | 1 | Do. |
| 6 | Alumina precalcined at 700° C. | 700 | Disintegrated every 24 hours. | 98 | Brown-cream. |
| 7 | Alumina precalcined at 1,000° C. | 700 | Disintegrated every 8 hours. | 30 | Strong brown-yellow. |
| 8 | do | 840 | None | 1.5 | Brilliant white. |

The results in the foregoing table show clearly the importance of the temperature factor in the preparation of lead aluminate. At temperatures of 700° C. and lower the time required for its formation renders the operation impractical. Disintegration by grinding the charge intermittently during the heating does not greatly accelerate the reaction, as is evident from a comparison of Examples 1 and 2. While light colored products applications where white opaque pigments are required and they are sufficiently stable to be wet-milled and dried if desired but I have found that lead aluminate pigments made with the so-called gamma aluminum oxide or with aluminum compounds, such as aluminum hydrate, which yield gamma aluminum oxide upon heating, are not stable in color when kept under normal atmospheric conditions gradually acquiring a yellow or brownish color. I have found that such products vary in stability in this respect, those made at the higher temperatures in the permissible range of 725° C. to 880° C. being far more stable than those made at lower temperatures. It may be that none of such products are perfectly stabilized though some, particularly those made at the higher temperatures, appear to be immune from discoloration in storage. The cause of this type of instability is not certainly known but is believed to be attributable, at least in part, to an incomplete reaction and conversion of the charge to lead aluminate. Under such conditions the reaction may be reversible with the reverse reaction velocity varying with the incompleteness of the original reaction. With the higher temperatures the reaction is driven rapidly to substantial completion with formation of a more stable product.

I have also found that lead aluminate pigments, made with gamma aluminum oxide, are unstable when subjected to the action of water. The instability of lead aluminate pigments results in a hydration of the pigment when subjected to the action of water, the action being accelerated at higher temperatures. With the more unstable lead aluminates the hydration is excessive and is accompanied by the development of a brown or gray color so that the degree of instability of that class may be roughly determined by noting the time required for noticeable color change; however, the degree of instability is best judged by determining the amount of hydration that results from subjecting the pigment to the action of water for a given time.

As a product stable lead aluminate has the advantage in various applications in the arts, many of which require water or aqueous solutions or involve the use of water in preparation of the product, that there is no danger of excessive hydration or possible discoloration. In the process of manufacturing lead aluminates the stable products have the distinct advantage that they may be handled in continuous systems of wet-milling and classification which may subject the pigment to the action of water for many days. It is permissible also to use higher temperatures in drying the wet-milled product.

I have discovered that the degree of stability of lead aluminate pigments is influenced by the nature and quality of materials used, the kind of aluminum oxide, or aluminum oxide containing compound, and on the method of preparing the aluminum oxide as well as upon the process of making the aluminate pigment. It is one of the objects of my invention to provide an improved method of making lead aluminates whereby the degree of stability of the product is controlled to impart the desired properties. I have found that the stability of lead aluminate pigments can be improved by longer calcining within the permissible temperature range, and to some extent by using alumina having finer particle size, but such procedures increase the cost of production and the product is not then stabilized to all conditions to which it may be subjected. If aluminum hydrate, or aluminum oxide which has been prepared by calcining aluminum hydrate at temperatures below 1000° C., is used in making the lead aluminate, the reaction between the lead and aluminum oxides will proceed rapidly to completion yielding a white product but one which is relatively less stable.

If anhydrous alumina, $Al_2O_3$, having the so-called alpha structure is used in making the lead aluminate the product will be perfectly stable but in that case, if the aluminum oxide has been prepared by calcining at a high temperature, the reaction between the lead and aluminum oxides takes place very slowly, making the process more expensive if not impracticable. The product is liable also to be of poorer color or relatively less white. The aluminum oxide of commerce is usually prepared by calcining at a high temperature and for such a time that the conversion to alpha aluminum oxide is substantially complete, such treatment being necessary to provide a product which will not re-hydrate in storage; therefore the usual aluminum oxide of commerce is not well adapted for the preparation of lead aluminates; but a satisfactory alpha aluminum oxide is readily and commercially obtainable by specification stating the temperature at which it is desired the product shall be calcined.

I have discovered that if gamma aluminum oxide, aluminum hydrate or other aluminum compound which upon heating yields only aluminum oxide is first calcined at a temerature of 900° C. or higher and then used to make the lead aluminate the stability of the pigment is greatly improved both in respect to discoloration when kept under normal atmospheric condition and to discoloration when subjected to the action of water. The degree of stability increases with the time and temperature at which the alumina is precalcined, while the amount of hydration which takes place upon treatment of the lead aluminate with water decreases. The increase in stability of the lead aluminate pigment I attribute to a more or less complete conversion of the alumina to the alpha structure during the pre-calcination. The change from gamma to alpha structure of the alumina probably starts at a temperature of about 900° C. and the conversion is apparently rapid and more nearly complete at 1200° C.

While, as before stated, the stability of the lead aluminate is improved by pre-calcining the alumina at temperatures above 900° C., I prefer, when making the product within the preferred temperature range 800 to 850° C., to pre-calcine the alumina at 1200° C. to 1300° C. when making the normal lead aluminate and at 1150° C. to 1250° C. when making basic lead aluminate. When making the lead aluminate at temperatures lower than 800° C. I prefer to pre-calcine the alumina in the temperature range 900 to 1100° C. and, in some cases, for a longer period to assure a more substantial conversion to the alpha form. I have discovered that within these temperature ranges alumina may be prepared which when used to make lead aluminate will combine readily with the lead compound to make a white pigment of satisfactory stability. Pre-calcination temperatures of the alumina higher than the ranges indicated may be employed but in that case, while the resulting lead aluminate will be stable, longer heating with the lead compound will be required and it will be increasingly difficult to make a pure white product.

The effect of pre-calcination of the aluminum hydrate on the properties and stability of normal lead aluminates made therefrom is shown in Table II. In making the products, equi-molecular quantites of lead oxide (PbO) and alumina in the condition shown in column 2 of the tabulation, were blended by milling and then calcined at the temperature and for the time shown in column 3.

and condition of materials and their treatment in process; therefore for any stock of materials and combination of factors the time treated with

Table II

| Example No. | Alumina precalcined | Lead aluminate calcined | Color of product | Time treated with water | Color after treatment | Hydration after treatment |
|---|---|---|---|---|---|---|
| | °C | °C    Hours | | Hours | | Per cent |
| 1 | Not precalcined | 840    2 | White | 48 | Brown | |
| | | | | 168 | Gray | 12.08 |
| 2 | ---do--- | 820    2 | ---do--- | 48 | Dark gray | 11.22 |
| 3 | ---do--- | 700    98 | Brown cream | 48 | Gray | 7.30 |
| 4 | ---do--- | 830    18 | White | 36 | ---do--- | |
| | | | | 84 | ---do--- | 6.28 |
| 5 | 900 | 840    2 | ---do--- | 96 | Slightly gray | 5.12 |
| 6 | 1,030 | 740    7 | ---do--- | 168 | ---do--- | 5.02 |
| 7 | 1,050 | 840    2 | ---do--- | 96 | ---do--- | 4.90 |
| 8 | 1,150 | 830    5 | ---do--- | 84 | Very slightly gray | 3.67 |
| 9 | 1,200 | 840    5 | ---do--- | 240 | White | 3.44 |
| 10 | 1,250 | 840    5 | ---do--- | 240 | ---do--- | 3.28 |
| 11 | 1,300 | 840    5 | Cream white | 240 | Cream white | 3.28 |
| 12 | 1,350 | 840    5 | Slightly yellow | 240 | Slightly yellow | 1.74 |
| 13 | 1,400 | 840    5 | Distinctly yellow | 240 | Distinctly yellow | 1.30 |

While, as before stated and as shown in Table II, it is difficult to make a white lead aluminate pigment when using alumina calcined above 1300° C., I have found such a white product can be made if the time of heating is sufficiently prolonged. For example, a portion of the mixture used in Example 13, Table II, with alumina calcined at 1400° C., was calcined for a period of 80 hours, yielding a cream white product of satisfactory color.

From the result in Table II it will be seen that those products made with alumina which had not been pre-calcined (aluminum hydroxide used) hydrated excessively during the treatment with water and discoloration of the product resulted after a comparatively short period of time. The products made with alumina precalcined in a temperature range 900 to 1050° C. show a slight gray color after long treatment with water but are nevertheless greatly improved. Such products before treatment with water are white pigments sufficiently stable for most applications either in anhydrous condition or after wet-milling but with exposure to water for a shorter period of time. Products made with alumina precalcined at higher temperatures show perfect or substantially perfect stability.

In my co-pending application for patent Serial No. 264,583, filed in the United States Patent Office March 28, 1939, I have described a method of making improved hydrated lead aluminates and have also disclosed how such hydrated products can be made color-stable by thoroughly washing with water.

I have furthermore discovered that an improved lead aluminate pigment can be made by controlled hydration of the product already stabilized by precalcining the alumina as before described. Such process and product I have fully disclosed and claimed in my co-pending application for patent, Serial Number 270,012, filed in the United States Patent Office April 25, 1939.

The control of hydration in the case of lead aluminates stabilized by precalcining the alumina is accomplished by selection of the temperature range for pre-calcining the alumina and regulation of the time during which the lead aluminate is subjected to the action of water as in the wet-milling and classification steps. However, as will be seen from Table II, the hydration is not necessarily proportional to the time treated with water but apparently depends also on the quality water would be varied as determined by trial to give the degree of hydration desired. The percentages of combined water shown in Table II indicate the hydration of the pigments after many hours' treatment with water, but for any degree of stability indicated a shorter treatment with water would have shown less hydration. This will be clearly apparent from the examples given later.

I prefer to hydrate the lead aluminate to the extent of 0.25 to 2.00 for, while for some purposes anhydrous pigment or pigment hydrated to a greater extent may be desired and can be made as indicated in Table II, I have found that lead aluminate pigments hydrated as indicated are, as compared with anhydrous products of better hiding power and greatly improved in dispersion properties and wetability with vehicles, such as linseed oil. When mixed and ground the pigment and vehicle readily combine to form a smooth paste, which upon further dilution with the vehicle forms a paint of creamy consistency that works easily under the brush and spreads to an even film in which the dispersion of pigment particles is remarkably uniform.

A study of my various lead aluminate pigments by examination of their X-ray diffraction patterns shows definite distinctions in the products and while, thus far, such distinctions have not been translated to definite structure, it is clear that, in the case of normal lead aluminates, the product made from alpha aluminum oxide (the alumina calcined at temperatures above 900° C.) is different from that made from gamma aluminum oxide.

By my improved process I can make normal and basic lead aluminate, $PbAl_2O_4$ and $Pb_2Al_2O_5$, or lead aluminates of intermediate basicity such as $Pb_3Al_4O_9$, or I can prepare by my methods aluminates of any desired composition, or containing an excess of either alumina or the basic element; the various aluminates, basic, subbasic, normal and subnormal adjusting during the heating process proportionally in the product in accordance with natural laws to the state of most stable equilibrium. In case either the aluminum or the basic element is in large excess, it is conceivable that the product would contain some of that oxide in solid solution or possibly some free oxide though the product would still consist preponderatingly of lead aluminate.

I have also discovered that useful subnormal lead aluminate pigments can be prepared by my process which have distinct advantages both in their application and from a manufacturing standpoint. Their lower content of lead oxide contributes to economy and while their hiding power is less and they will not permit as large an admixture of cheap extender pigments, they still retain to a large degree their inherent property of imparting durability to paints. From a manufacturing standpoint their higher content of aluminum oxide permits a higher calcination temperature thus tending to economical operation and greater stability of the resulting pigment. However, I prefer subnormal lead aluminates containing not less than 40% lead oxide, thus being essentially pure, consisting preponderatingly of chemically combined lead and aluminum oxides and containing no oxides other than lead and aluminum except it be traces of impurities from the raw materials and combined water in the case of hydrated lead aluminates.

By the expressions normal lead aluminate, subnormal lead aluminate and basic lead aluminate, as used in the specification and claims, I mean: (1) normal lead aluminate, a product having an equimolecular ratio of PbO to $Al_2O_3$; (2) subnormal lead aluminate, a product having a ratio of PbO to $Al_2O_3$ less than equimolecular, and (3) basic lead aluminate, a product having a ratio of PbO to $Al_2O_3$ greater than equimolecular.

Before giving specific examples of my invention, I will first give a general description of my improved methods covering certain features which are common in the preparation of all my lead aluminate pigments.

As a source of aluminum oxide, I may use alumina ($Al_2O_3$) or any aluminum compound which upon heating yields aluminum oxide, such as aluminum hydrate or aluminum nitrate, but I prefer to use aluminum hydrate which can be pre-calcined under controlled conditions to impart the desired stability to the lead aluminate. As a source of lead oxide, I may use the oxide as such, or any compound of lead that will yield the required oxide upon heating. For example, in the preparation of lead aluminate I may use either litharge (PbO), or red lead ($Pb_3O_4$), or lead peroxide ($PbO_2$), or white lead $$(2PbCO_3.PbH_2O_2)$$

Pre-calcined aluminum oxide is prepared for use by calcining at a temperature above 900° C., preferably, as before stated, within a temperature range of 1000° C. to 1300° C. The alumina can be calcined in any suitable furnace either of the batch type, such as a hearth or Bruckner furnace, or continuous type such as a rotary kiln. The furnace may be electrically heated or fuel fired. Heated gases contacting the charge should be free from dust which might contaminate the charge with discoloring elements such as iron. A fire brick lining is satisfactory.

I thoroughly mix the aluminum and lead compounds in the required proportions either by dry-milling, or preferably, by wet-milling, thereby reducing particle size and also assuring a very close association of the ingredients. The milling may be done either in a batch or a continuous type of mill; in either case I prefer to use a porcelain or silex lining to avoid contamination of materials. The slurrry from wet-mill is dewatered as by settling and decantation and/or filtration. Any suitable equipment may be used: for example, Dorr tanks and filter presses.

If desired, the charge can be prepared in conjunction with the separation of aluminum hydrate from sodium aluminate solutions by such well-known methods as the Bayer process of seeding the aluminate solution with aluminum hydrate and agitating to precipitate the aluminum; or by precipitation of the aluminum hydrate by passing carbon dioxide gas into the solution. It is only necessary to suspend the lead compound in the sodium aluminate solution and precipitate the aluminum hydrate as usual while agitating the charge. The thoroughly blended mixture of aluminum hydrate and lead compound is then separated from the alkaline liquor and thoroughly washed. This method of preparing the mixture of material has the advantage that a thorough blend of very fine-grained particles is obtained. Under the usual conditions of precipitating aluminum hydrate by itself the process is one of crystallizing from solution and once started the grain size increases rapidly, resulting in the usual very coarse-grained commercial aluminum hydrate. Commercial oxide of lead is a very fine-grained powder and when suspended in the sodium aluminate solution presents an exceedingly large surface on which aluminum hydrate can precipitate by crystallizing at an infinite number of separate points and yielding a very fine-grained product.

The wet pulp prepared by either of the methods described, may be charged directly into the heating furnace or may be first dried and then charged into the furnace. The furnace may be either of the batch type such as a muffle, hearth furnace or Bruckner furnace, or of the continuous kiln type. In either case a lining of high grade fire brick is satisfactory to avoid contamination of materials. Whatever the type of furnace, means should be provided for close control of temperature as the upper limit of temperature range for lead aluminates is but little below the fusion point of lead oxide and lead aluminate. In furnaces where products of combustion contact the charge a neutral or oxidizing flame should be maintained to avoid possible reduction of metallic oxides.

The time required in the calcining zone depends upon the temperature. The higher the temperature within the permissible range, of 700 to 880° C., the shorter the time. There is, however, tendency to clearer color tones at the lower and medium temperatures within the preferred range of 800 to 850° C. Lead aluminate sinters and fuses, if the upper limit of temperature range is exceeded for a considerable length of time.

Preferred temperature ranges for various lead aluminates from the standpoint of economy and stability of resulting products I have found to be substantially as follows:

|  | °C. |
| --- | --- |
| Subnormal lead aluminate, approximately, $PbO.3Al_2O_3$ | 870 to 880 |
| Subnormal lead aluminate, approximately, $PbO.2Al_2O_3$ | 850 to 880 |
| Normal lead aluminate ($PbAl_2O_4$) | 830 to 850 |
| Basic lead aluminate ($Pb_3Al_4O_9$) | 820 to 840 |
| Basic lead aluminate ($Pb_2Al_2O_5$) | 810 to 830 |

The progress of the reaction during calcining may be readily judged by withdrawing a small sample from the furnace for observation. The lead aluminates will be colored when the reaction is incomplete, but will be substantially white in either hot or cold condition when the reaction is complete.

Some of the lead aluminates are sufficiently fine, as discharged from the calcining furnace, if care has been used not to exceed the upper limit of the calcining temperature range, to be used as pigments for paints, but usually milling is required to break down aggregates and also to reduce particle size.

Either dry or wet-milling methods may be used with or without air separation or wet classification respectively, thereby assuring uniformity of product. If wet-milling has been employed, the slurry is dewatered, dried, and if necessary passed through a disintegrator to break down lumps and aggregates.

The following examples are given as illustrative of the operative procedures I use and of the characteristics of some of the products, but should not be regarded as limiting the broad application of my improved method.

EXAMPLE 1.—*Normal lead aluminate, $PbAl_2O_4$*

171 parts of lead oxide (litharge) and 121 parts aluminum hydrate (=78 parts of aluminum oxide) were wet-milled together and the slurry then dewatered and dried. The mixture was then calcined at 830° C. to 850° C. for 2½ hours. The product after milling had an oil absorption of 10.1 parts of oil per 100 parts of pigment and hiding power equal to Dutch process white lead. Specific gravity of pigment 6.50. Chemical composition was found to be substantially as follows:

| | Per cent |
|---|---|
| Lead oxide | 68.6 |
| Aluminum oxide | 31.4 |
| | 100.0 |

EXAMPLE 2.—*Basic lead aluminate, $Pb_3Al_4O_9$*

192 parts of lead oxide (litharge) and 90 parts aluminum hydrate (=58.5 parts of aluminum oxide) were wet-milled, dewatered, dried and calcined for 2 hours at 820° C. to 840° C. The product after milling had an oil absorption of 9.64 parts oil per 100 parts of pigment and hiding power equal to Dutch process white lead. Specific gravity of pigment 7.05. Chemical composition was found to be substantially as follows:

| | Per cent |
|---|---|
| Lead oxide | 76.6 |
| Aluminum oxide | 23.4 |
| | 100.0 |

EXAMPLE 3.—*Basic lead aluminate, $Pb_2Al_2O_5$*

163 parts of lead oxide (litharge) and 57 parts of aluminum hydrate (=37 parts of aluminum oxide) were wet-milled together, dewatered, dried and calcined for 2 hours at 810° C. to 830° C. The product after milling had an oil absorption of 7.71 parts of oil per 100 parts of pigment and hiding power equal to Dutch process white lead. Specific gravity of pigment 7.43. Chemical composition was found to be substantially as follows:

| | Per cent |
|---|---|
| Lead oxide | 81.4 |
| Aluminum oxide | 18.6 |
| | 100.0 |

EXAMPLE 4.—*Normal lead aluminate*

25 parts of sodium aluminate, equivalent to 13.75 parts of aluminum oxide, were dissolved in 150 parts of hot water and diluted to 1500 parts. 30 parts of lead oxide (litharge) then were added to the sodium aluminate solution and carbon dioxide conducted into the solution while agitating until the aluminum was completely precipitated. The mixed solids were filtered out, washed until free from alkaline solution, dried and calcined for 2 hours at 830° C. The calcined lead aluminate was wet-milled for 1½ hours, dewatered and dried.

EXAMPLE 5.—*Normal lead aluminate, $PbAl_2O_4$*

78 parts of aluminum oxide, $Al_2O_3$, which had been prepared by pre-calcining aluminum hydrate for 2 hours at 1200° C., and 171 parts of lead oxide (litharge) were wet-milled together and the slurry dewatered and dried. The mixture was calcined at 830° C. to 850° C. for 2 hours. The calcined pigment was then wet-milled for 1 hour, allowed to stand for 11 hours, and dried at 90° C. to 100° C. The finished pigment showed a loss upon calcination (de-hydration) of 0.45% and hence had a chemical composition:

| | Per cent |
|---|---|
| Lead oxide | 68.30 |
| Aluminum oxide | 31.25 |
| Combined water | .45 |

Specific gravity, 5.90.
Oil absorption 16 parts oil per 100 parts pigment.
Hiding power 115 compared with white lead taken as 100.

EXAMPLE 6.—*Basic lead aluminate, $Pb_3Al_4O_9$*

58 parts of aluminum oxide, $Al_2O_3$, which had been prepared by pre-calcining aluminum hydrate for 2 hours at 1200° C., and 192 parts of lead oxide (litharge) were wet-milled together and the slurry dewatered and dried. The mixture was calcined for 2 hours at 820° C. to 840° C. The calcined product was then wet-milled for 1 hour, allowed to stand for 11 hours and dried at 90 to 100° C. The finished pigment showed a loss upon calcination (dehydration) of .94% and hence had the chemical composition:

| | Per cent |
|---|---|
| Lead oxide | 75.86 |
| Aluminum oxide | 23.20 |
| Combined water | .94 |

Specific gravity, 6.25.
Oil absorption 14 parts of oil per 100 parts pigment.
Hiding power 120 compared with white lead taken as 100.

EXAMPLE 7.—*Basic lead aluminate, $Pb_2Al_2O_5$*

56 parts of aluminum oxide, $Al_2O_3$, which had been prepared by pre-calcining aluminum hydrate for 2 hours at 1150° C., and 244 parts of lead oxide (litharge) were wet-milled together and the slurry dewatered and dried. The mixture was calcined for 2 hours at 810 to 830° C. The calcined product was then wet-milled for 1 hour, allowed to stand for 11 hours and dried at 90 to 100° C. The finished pigment showed a loss upon calcination (de-hydration) of 1.08% and hence had the chemical composition:

| | Per cent |
|---|---|
| Lead oxide | 80.53 |
| Aluminum oxide | 18.40 |
| Combined water | 1.07 |

Specific gravity, 6.73.
Oil absorption 13 parts oil per 100 parts pigment.
Hiding power 135 compared with white lead taken as 100.

EXAMPLE 8.—*Normal lead aluminate,* $PbAl_2O_4$ 31.4 parts of aluminum oxide, $Al_2O_3$, which had been prepared by pre-calcining aluminum hydrate for 2 hours at 1030° C., and 68.6 parts of lead oxide, PbO, were wet-milled together for 3 hours and the slurry then dewatered and dried. The mixture was then calcined for 7 hours at a temperature of 740° C. The calcined pigment was then wet-milled for 1 hour, the slurry allowed to stand for 11 hours and finally dewatered and dried at a temperature of 90 to 100° C. The finished pigment showed a loss upon calcination (de-hydration) of 1.68% and the chemical composition:

| | Per cent |
|---|---|
| Lead oxide | 67.52 |
| Aluminum oxide | 30.80 |
| Combined water | 1.68 |

A small portion of the finished pigment was treated with cold water for a period of 168 hours without any discoloration, thus showing satisfactory stability.

EXAMPLE 9.—*Subnormal lead aluminate, approximate molecular proportions* $PbO \cdot 2Al_2O_3$ 50 parts of aluminum oxide, $Al_2O_3$, which had been prepared by pre-calcining aluminum hydrate for 2 hours at 1030° C., and 50 parts of lead oxide, PbO, were wet-milled together for 3 hours and the slurry then de-watered and dried. The mixture was then calcined for 23 hours at 725° C. The calcined pigment was then wet-milled for 1 hour, the slurry allowed to stand for 11 hours and finally dewatered and dried at a temperature of 90 to 100° C. The finished pigment showed a loss upon calcination (de-hydration) of 1.22% and chemical composition:

| | Per cent |
|---|---|
| Lead oxide | 49.39 |
| Aluminum | 49.39 |
| Combined water | 1.22 |

A small portion of the finished pigment was treated with cold water for a period of 168 hours. The treated product had a very slightly gray tone and after drying contained 1.82% combined water, thus showing a substantially stable pigment.

EXAMPLE 10.—*Subnormal lead aluminate approximate molecular proportions* $PbO \cdot 3Al_2O_3$ A mixture of 20 parts of lead oxide, PbO, and 46.2 parts of aluminum hydrate, equivalent to 30 parts of aluminum oxide, was prepared by wet-milling the materials together for 1 hour and then dewatering and drying the mixture.

The mixture was then calcined for 1 hour at a temperature of 880 to 910° C.

*Chemical composition of finished pigment*

| | | |
|---|---|---|
| Lead oxide | Per cent | 40 |
| Aluminum oxide | do | 60 |
| Color | | Cream white |
| Tinting strength—white lead standard=100 | | 50 |

EXAMPLE 11.—*Subnormal lead aluminate, approximate molecular proportions* $PbO \cdot 2Al_2O_3$ A mixture of 58 parts of white lead carbonate, equivalent to 50 parts of lead oxide, and 77 parts of aluminum hydrate, equivalent to 50 parts of aluminate oxide, was prepared by wet-milling the materials together for one hour and then dewatering and drying the mixture.

The mixture was calcined for 26 hours at a temperature of 725° C.

Tinting strength, white lead standard=100__ 55

My improved lead aluminate pigments are insoluble in, and substantially unaffected by water, and though as a group, they are attacked by concentrated acids, and also to some extent by dilute reagents depending upon variety, they are relatively resistant to chemical action.

Two classes of white pigments are generally recognized: (1) the opaque white pigments, such as white lead, zinc oxide, and titanium pigments which impart opacity and whiteness when mixed with oil or other organic vehicle; and (2) the extender pigments, such as whiting and china clay, which do not impart appreciable opacity when similarly mixed with vehicles.

The opaque pigments of class 1 are further subdivided into two classes: (a) those which are reactive or capable of combining chemically or physico-chemically with ingredients of the vehicle, such as white lead and zinc oxide; and (b) those which are chemically inert, such as titanium pigments.

It is well known that the reactive pigments have a special value, not possessed by inert pigments, of enhancing certain desirable properties in paints and other products to which they are applied. For example, white lead has the property of combining with linseed oil and other vehicles to form a tough elastic coating which is very resistant to light and weather when spread and exposed. Zinc oxide reacts with oil and other vehicles of paint products to harden the film or coating thereby rendering it more resistant to abrasion as well as improving gloss, and when exposed is more resistant to dirt collection.

My lead aluminate pigments belong to the class of opaque reactive pigments though they differ in degree of reactivity. This is quite apparent from the characteristics of paint film to be discussed later, but it is definitely indicated in the case of the basic lead aluminates by their capacity to accelerate the drying of raw linseed oil when mixed with it and spread as paint in a manner similar to the drying action of white lead. This is shown roughly in a quantitative way by the following test and results.

Mixtures of various lead aluminates and white lead carbonate were made with raw linseed oil using the same proportion of pigment to vehicle by volume. The mixtures were spread, as rather thick coatings, on a steel plate as nearly as possible at the same spreading rate. The time for the films to become dry to the touch was recorded in hours as follows:

| | Hours |
|---|---|
| Basic carbonate white lead | 52 |
| Normal lead aluminate | 110 |
| Basic lead aluminate ($Pb_3Al_4O_9$) | 47 |
| Basic lead aluminate ($Pb_2Al_2O_5$) | 36 |
| 50% basic lead aluminate ($Pb_2Al_2O_5$), 50% titanium barium pigment | 48 |

From these results, it will be noted that the normal lead aluminate, though accelerating the drying of linseed oil more than is the case with an inert pigment, is relatively feebly reactive, while the basic lead aluminates are more reactive than white lead. The result showing the accelerating action of basic lead aluminate when mixed with a titanium pigment is particularly important from a practical application standpoint as well as strongly indicating the reactive properties of lead aluminate.

The properties of lead aluminate pigments adapt them for application in oil, enamel, and lacquer type paints, and also for other purposes where white pigments are used, such as for rubber, linoleum and other floor coverings, printing ink, vitrified enamels etc., but the outstanding characteristic of lead aluminate pigments is their capacity to impart durability to paints.

I have discovered that paints made with my lead aluminate pigments ground with raw linseed oil vehicle are exceptionally durable when exposed to light and weather and impart improved durability where the lead aluminate is used in paint in admixture with other pigment, such as titanium pigment, white lead and zinc oxide, either with or without tinting and extender pigments.

I have furthermore discovered that paints made with lead aluminates give remarkable protection to iron and steel under exposure to light, weather and other influences. This result I attribute to the reactive nature of the pigments, the lead oxide or the excess lead oxide in the basic lead aluminates functioning like free oxides of lead, such as red lead which for many years has been used with linseed oil as paint where maximum protection of iron or steel is desired.

I claim as my invention:

1. In the method of making an essentially pure, white, lead aluminate which consists in heating a mixture of lead oxide (PbO) and aluminum oxide to substantially complete chemical combination in the solid phase, the step which consists in pre-calcining the aluminum oxide at temperatures above 900° C.

2. The method of making an essentially pure, anhydrous, water-insoluble lead aluminate pigment which consists in making a mixture of such lead and aluminum compounds as will, upon heating, supply to the product only lead oxide (PbO) and aluminum oxide and then heating the mixture in the temperature range 810 to 850° C. until the said oxides chemically combine in the solid phase without fusion to form said lead aluminate pigment.

3. An essentially pure opaque white pigment consisting of anhydrous lead aluminate in the preparation of which alumina precalcined at temperatures above 900° C. is chemically combined with lead oxide by heating in the solid phase, said pigment being characterized by absence of any substantial discoloration when treated with water.

4. An essentially pure opaque white pigment consisting of anhydrous normal lead aluminate in the preparation of which alumina precalcined at temperatures above 900° C. is chemically combined with lead oxide by heating in the solid phase, said pigment being characterized by absence of any substantial discoloration when treated with water.

5. An essentially pure opaque white pigment consisting of anhydrous basic lead aluminate in the preparation of which alumina precalcined at temperatures above 900° C. is chemically combined with lead oxide by heating in the solid phase, said pigment being characterized by absence of any substantial discoloration when treated with water.

6. An essentially pure opaque white pigment consisting of anhydrous subnormal lead aluminate in the preparation of which alumina precalcined at temperatures above 900° C. is chemically combined with lead oxide by heating in the solid phase, said pigment being characterized by absence of any substantial discoloration when treated with water.

7. An essentially pure opaque white pigment consisting of anhydrous lead aluminate in the preparation of which alumina precalcined at temperatures above 900° C. is chemically combined with lead oxide by heating in the solid phase, said pigment being characterized by absence of discoloration when treated with water for a period of at least 72 hours.

8. The method of making an essentially pure, white, anhydrous, stabilized lead aluminate pigment, which consists in pre-calcining aluminum oxide at temperatures above 900° C., mixing the pre-calcined aluminum oxide with a lead compound which will, upon heating, supply to the product only lead oxide (PbO), and then heating the mixture in the temperature range 725° C. to 880° C. to substantially complete reaction and chemical combination of the oxides of lead and aluminum in the solid phase without fusion to form said lead aluminate pigment.

9. The method of making an essentially pure, white, anhydrous, stabilized basic lead aluminate pigment which consists in pre-calcining aluminum oxide at temperatures above 900° C., mixing the pre-calcined aluminum oxide with a lead compound which will, upon heating, supply to the product only lead oxide (PbO) in ratios of PbO to $Al_2O_3$ greater than equimolecular and then heating the mixture in the temperature range 725° C. to 880° C. to substantially complete reaction and chemical combination of the oxides of lead and aluminum in the solid phase without fusion to form a basic lead aluminate pigment.

10. The method of making an essentially pure, white, anhydrous stabilized subnormal lead aluminate pigment which consists in pre-calcining aluminum oxide at temperatures above 900° C., mixing the pre-calcined aluminum oxide with a lead compound which will, upon heating, supply to the product only lead oxide (PbO) in ratios of PbO to $Al_2O_3$ less than equimolecular and then heating the mixture in the temperature range 725° C. to 880° C. to substantially complete reaction and chemical combination of the oxides of lead and aluminum in the solid phase without fusion to form a subnormal lead aluminate pigment.

11. The method of making an essentially pure, white, anhydrous, stabilized normal lead aluminate pigment, which consists in pre-calcining aluminum oxide at temperatures above 900° C., mixing the pre-calcined aluminum oxide and a lead compound which upon heating will supply to the product only lead oxide (PbO) in equimolecular proportion to the aluminum oxide and then calcining the mixture in the temperature range 725° C. to 880° C. to substantially complete reaction and chemical combination of the oxides of lead and aluminum in the solid phase without fusion to form said normal lead aluminate pigment.

12. The method of making an essentially pure, white, anhydrous, water-insoluble lead aluminate pigment, which consists in intimately mixing such lead and aluminum compounds as will, upon heating, supply to the product only lead oxide (PbO) and aluminum oxide and then heating the mixture in the temperature range 725° C. to 880° C. for a time not exceeding 40 hours until the oxides substantially completely combine in the solid phase without fusion to form said lead aluminate pigment.

13. The method of making an essentially pure, white, anhydrous, water-insoluble basic lead aluminate pigment which consists in intimately mixing such lead and aluminum compounds as will, upon heating, supply to the product only lead oxide (PbO) and aluminum oxide, in proportions to form a basic lead aluminate containing 69 to 81% lead oxide (PbO) and the balance aluminum oxide, and then heating the mixture in the temperature range 725° C. to 880° C. for a time not exceeding 40 hours until the oxides substantially completely combine in the solid phase without fusion to form a basic lead aluminate pigment.

14. The method of making an essentially pure, white, anhydrous, water-insoluble subnormal lead aluminate pigment which consists in intimately mixing such lead and aluminum compounds as will, upon heating, supply to the product only lead oxide (PbO) and aluminum oxide, in proportions to form a subnormal lead aluminate containing 40 to 68% lead oxide (PbO) and the balance aluminum oxide, and then heating the mixture in the temperature range 725° C. to 880° C. for a time not exceeding 40 hours until the oxides substantially completely combine in the solid phase without fusion to form a subnormal lead aluminate pigment.

15. The method of making an essentially pure, anhydrous, water-insoluble white lead aluminate pigment which consists in intimately mixing lead oxide (PbO) and aluminum hydrate and then heating the mixture in the temperature range 725° C. to 880° C. for a time not exceeding 40 hours until the oxides of lead and aluminum substantially completely combine in the solid phase without fusion to form said lead aluminate pigment.

16. The method of making an essentially pure, anhydrous, water-insoluble white lead aluminate pigment which consists in intimately mixing lead oxide (PbO) and aluminum oxide and then heating the mixture in the temperature range 725 to 880° C. for a time not exceeding 40 hours until the oxides of lead and aluminum substantially completely combine in the solid phase without fusion to form said lead aluminate pigment.

17. The method of making an essentially pure, white, anhydrous, water-insoluble normal lead aluminate pigment (PbAl$_2$O$_4$) which consists in intimately mixing quantities of lead and aluminum compounds which upon heating will supply to the product only lead oxide (PbO) and aluminum oxide in equimolecular quantities and then heating the mixture in the temperature range 725° C. to 880° C. for a time not exceeding 40 hours until the oxides substantially completely combine in the solid phase without fusion to form said normal lead aluminate pigment.

18. The method of making an essentially pure, white, anhydrous, water-insoluble basic lead aluminate pigment which consists in intimately mixing lead and aluminum compounds selected from the group consisting of PbO, Al$_2$O$_3$, and compounds yielding only PbO and Al$_2$O$_3$ as a solid residue upon heating, in ratios of PbO to Al$_2$O$_3$ greater than equimolecular but proportioned to yield products containing not less than 69% of PbO and then heating the mixture in the temperature range 725° C. to 880° C. for a time not exceeding 40 hours until the oxides substantially completely combine in the solid phase without fusion to form a basic lead aluminate pigment.

19. The method of making an essentially pure, white, anhydrous, water-insoluble subnormal lead aluminate pigment which consists in intimately mixing such lead and aluminum compounds selected from the group consisting of PbO, Al$_2$O$_3$ and compounds yielding only PbO and Al$_2$O$_3$ as a solid residue upon heating, in ratios of PbO to Al$_2$O$_3$ less than equimolecular but proportioned to yield products containing not more than 68% of PbO and then heating the mixture in the temperature range 725° C. to 880° C. for a time not exceeding 40 hours until the oxides substantially completely combine in the solid phase without fusion to form a subnormal lead aluminate pigment.

20. An opaque white pigment consisting essentially of anhydrous, water-insoluble basic lead aluminate containing 73 to 81% lead oxide (PbO) and the balance aluminum oxide, prepared by combining the oxides in the solid phase in the temperature range 725 to 880° C.

21. An opaque white pigment consisting essentially of anhydrous, water-insoluble subnormal lead aluminate containing 40 to 63% lead oxide (PbO) and the balance aluminum oxide, prepared by combining the oxides in the solid phase in the temperature range 725 to 880° C.

22. An opaque white pigment consisting essentially of anhydrous, water-insoluble basic lead aluminate containing not less than 73% of lead oxide (PbO) and the balance aluminum oxide, prepared by combining the oxides in the solid phase in the temperature range 725 to 880° C.

23. An opaque white pigment consisting essentially of anhydrous water-insoluble subnormal lead aluminate containing not more than 63% lead oxide (PbO) and the balance aluminum oxide, prepared by combining the oxides in the solid phase in the temperature range 725 to 880° C.

24. An opaque, white, anhydrous, water-insoluble lead aluminate pigment, prepared by combining lead oxide (PbO) and aluminum oxide in the solid phase in the temperature range 725 to 880° C., the percentage lead oxide content of said pigment differing numerically from the percentage lead oxide content of normal lead aluminate (PbAl$_2$O$_4$) by not less than 4.

LOUIS E. BARTON.